No. 792,294. PATENTED JUNE 13, 1905.
G. SVANLJUNG.
ROLLING BLADE OR SPADE HARROW.
APPLICATION FILED NOV. 16, 1903.

WITNESSES:
F. H. Schott
Edwin D. Balinger

INVENTOR
Gustaf Svanljung
BY
George U. Massie
his Attorneys

No. 792,294. Patented June 13, 1905.

UNITED STATES PATENT OFFICE.

GUSTAF SVANLJUNG, OF WASA, RUSSIA.

ROLLING BLADE OR SPADE HARROW.

SPECIFICATION forming part of Letters Patent No. 792,294, dated June 13, 1905.

Application filed November 16, 1903. Serial No. 181,348.

*To all whom it may concern:*

Be it known that I, GUSTAF SVANLJUNG, a subject of the Archduke of Finland, and a resident of Wasa, in the Archduchy of Finland, Russia, have invented certain new and useful Improvements in Rolling Blade or Spade Harrows, of which the following is a specification, reference being had therein to the accompanying drawings.

This invention relates to an improvement in harrows, and particularly that type known as the "rolling" blade-harrow, and has for its object the provision of means whereby the soil can be thoroughly pulverized to a considerable depth and left with a smooth even surface, provision also being made for keeping the operative blades clear of debris. These objects are, in general terms, obtained by arranging the gangs of cutters or blades in two pairs, one pair in front with the shafts disposed at an angle to each other and tending to travel in converging lines, the other pair arranged behind the first with their shafts disposed at an angle to each other and traveling in diverging lines. Each gang consists of a shaft having arranged thereon a series of cutting-blades having sharp edges and of considerable width, as distinguished from disks or spikes which are commonly used. These blades are arranged upon the shaft at their central portion, and consequently extending for an equal distance on opposite sides of the shaft. Each succeeding blade, moreover, is arranged at a slightly different angle from the horizontal, so as to constitute a succession of cutting-surfaces arranged spirally lengthwise of the shaft. Between the blades extend bars occupying a position immediately beneath the axle of the blade at a right angle thereto, which bars serve to loosen and remove any weeds or other material which would otherwise become entangled with the blades. These rods also serve to prevent the harrow from sinking too deeply in loose soil.

In order that my invention may be clearly understood, I have in the accompanying drawings illustrated an embodiment thereof in which the several parts are indicated by reference-numerals which correspond throughout the views.

Figure 1:
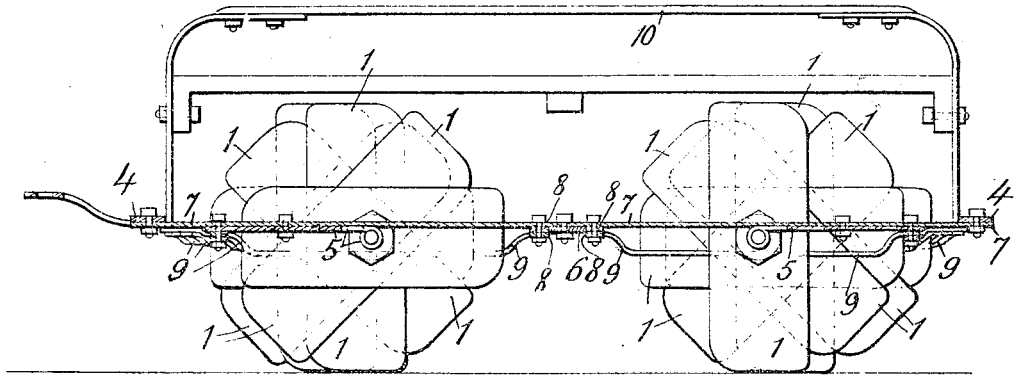
Figure 2:
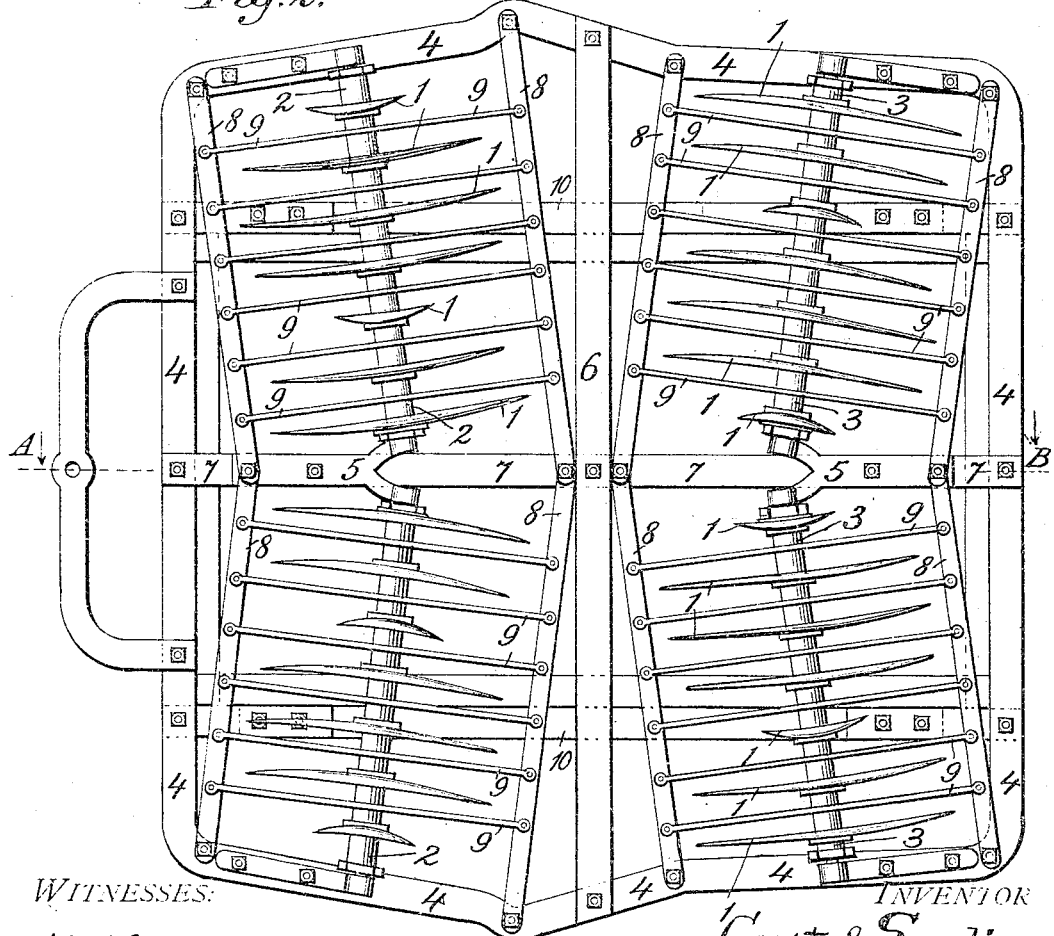

In the drawings, Figure 1 is a vertical section on the line A B of Fig. 2, representing, therefore, substantially an elevation of one-half of the harrow; and Fig. 2 is a bottom plan view of the harrow.

The blades 1 are arranged spirally upon the forward and rearward shafts 2 and 3, which shafts are journaled at their outer ends in bearings carried by means of frame 4 and at their inner ends in bearings carried by forked supports 5, mounted upon a central bridge 7, a cross-beam 6 connecting the central portion of the bridge 7 and the frame 4 for purposes of greater stability. Cross-bars 8 are arranged between the bridge 7 and the outer edges of the frame 4 and parallel to the shafts 2 and 3, and these bars 8 serve as supports for the ends of a series of rods 9, which extend transversely of the shafts 2 and 3 and immediately below the same, the rods being so spaced apart as to occupy each a position between two succeeding blades. Above the gangs of blades is arranged a platform with runners 10, which latter may be utilized in moving the harrow from place to place in an inverted position.

In operation as the front gang of blades throws the pulverized soil in one direction the following gang throws it in the opposite direction and leaves a finely-pulverized thoroughly-disintegrated soil, having a smooth upper surface. The respective blades being each of considerable width and provided with cutting edges arranged spirally upon the shaft, sod and refractory clods instead of being crushed are finely sliced by the edges of the succeeding blades, thus adapting the invention particularly to virgin soil, where the ordinary disk harrow would cut in strips and the crushing or spike harrow would be of little use.

The arrangement of the blades upon a small shaft as distinguished from a hub or shaft of considerable size and the provision of a grid consisting of bars extending between the blades and immediately beneath the shaft forming their axle result in an increase of the operative extent of the blades and also enables the bars to exert a cleaning effect upon the blades until the latter have reached a horizontal position.

Having thus fully described my invention, what I claim as new, and desire to secure by Letters Patent of the United States, is—

In a harrow, the combination, with rotary gangs of blades having cutting edges, the gangs arranged in two pairs, the gangs of each pair arranged at an angle one to the other, one pair rotating in planes converging toward the front and the other pair rotating in planes converging toward the rear, each gang comprising a series of blades having cutting edges and arranged progressively at a different angle to the horizontal and spirally of the shaft, side bars arranged parallel to each shaft, and cross-bars connecting the parallel bars and extending between the respective blades immediately beneath the shaft.

In witness whereof I have hereunto signed my name in the presence of two subscribing witnesses.

GUSTAF SVANLJUNG.

Witnesses:
CARL A. CARLSON,
FREDRIK THURING.